(No Model.)

A. OBERMEYER.
GRATER.

No. 344,005. Patented June 22, 1886.

Witnesses
J. Wetter
Y. A. Rae

Inventor
Alexander Obermeyer
by H. Haddan
Atty

N. PETERS, Photo-Lithographer, Washington, D. C.

UNITED STATES PATENT OFFICE.

ALEXANDER OBERMEYER, OF BARMEN-RITTERSHAUSEN, GERMANY.

GRATER.

SPECIFICATION forming part of Letters Patent No. 344,005, dated June 22, 1886.

Application filed November 19, 1884. Serial No. 148,352. (No model.)

*To all whom it may concern:*

Be it known that I, ALEXANDER OBERMEYER, of Barmen-Rittershausen, Germany, have invented a new and useful Grater for Household Use, of which the following is a specification.

My invention relates to that class of vegetable-graters which have a conoidal grater adapted to revolve in a casing serving as a receptacle for the material to be treated.

The improvement consists in the shape of the said casing, and the position of the grater relatively to the casing, as specified in the claim.

Figure 1:
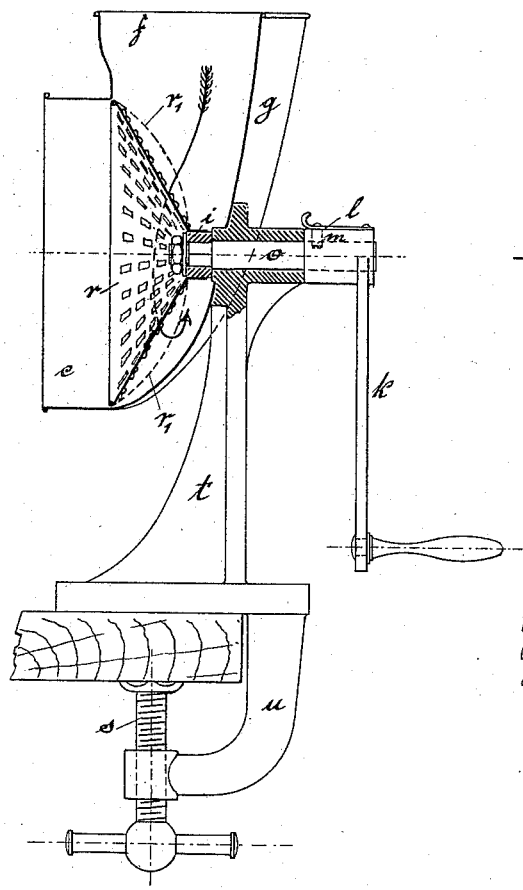
Figure 2:
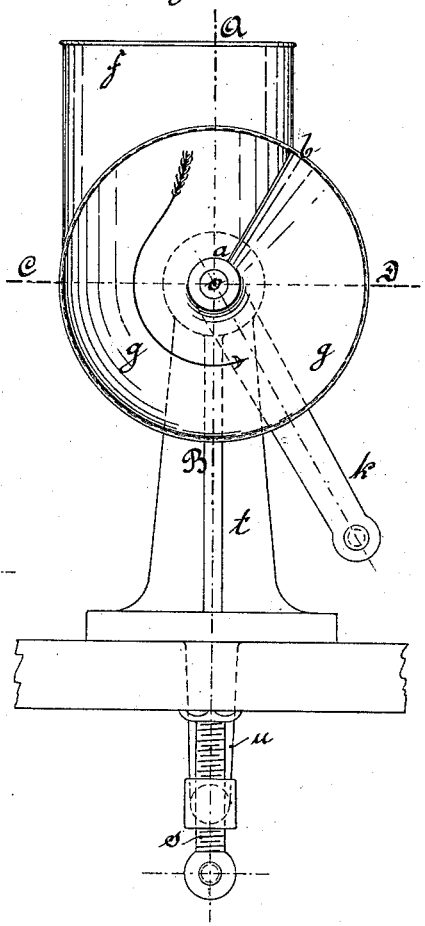
Figure 3:
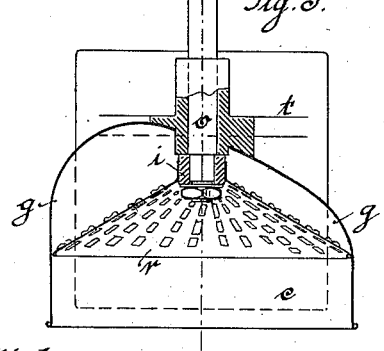
Figure 4:
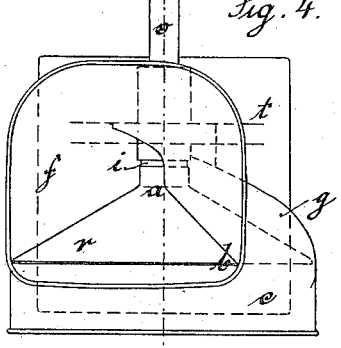

In the following description reference will be made to the annexed drawings, of which Figure 1 is a vertical section along line A B of Fig. 2; Fig. 2, a front elevation; Fig. 3, a horizontal section along line C D of Fig. 2, and Fig. 4 a plan of a grating device embodying the invention.

The grating or rasping machine chiefly comprises a snail-shell-shaped or conchoidal casing, $g$, a conoidal grating or rasping disk, $r$, a frame or stand, $t$, with shaft $o$, and crank $k$. The casing $g$ has in front a cylindrical aperture, $c$, closed at the inner end by the disk $r$, forming a partition between the outlet $c$ and the body of the casing. The rear wall of the casing is curved similarly to the casing of a snail, having its axis placed horizontal and its opening at the top, thus forming around the disk $r$ an annular space which is widest at the top opening, $f$, and gets gradually narrower in the direction of the arrow, Fig. 2—that is to say, in the direction in which the disk $r$ revolves—until the rear wall nearly touches the disk $r$ along a line $a$ $b$, Fig. 2. The rear wall of the casing $g$ thus forms a sort of spiral or helical surface having for its axis the axis of revolution of the disk $r$.

When the casing is filled or partly filled with material to be rasped, and the conoidal disk $r$, secured at its apex to the axle $o$, is turned, the whole grating-surface of the disk is simultaneously set in action and the material gradually conducted (in the direction of rotation indicated in the drawings by arrows) into the narrowest part of the receptacle, so that even the smallest parts of the material are completely rasped.

The teeth of the grating-disk are formed in the usual manner by stamping out the edge on one side of the holes, and as the entire surface of the disk which faces the interior of the casing is simultaneously set in action the rasping of the material is effected in an exceedingly short time, while it requires only a slight effort to turn the machine.

After removing the crank $k$, which is held on the axle $o$ by a spring, $l$, with pin $m$, the grating-disk may be easily taken out of the casing, whereupon all parts of the machine may be cleaned, and the disk may then be easily replaced by another disk having larger or smaller teeth.

The grating-disk may be more or less conical or flat, or it may have a hemispherical shape, as indicated in Fig. 1 by dotted lines $r'$.

The frame $t$, which supports the apparatus, is provided at its base-plate with an arm or clamp, $u$, and screw $s$, for securing the machine to a table, or to any other suitable support.

What I claim is—

The combination of a conoidal grating-disk, $r$, adapted to be turned on its axis, with a conchoidal casing, $g$, provided with inlet $f$, circular outlet $c$, and with a conchoidal rear wall adapted to form around the disk $r$ an annular receptacle gradually narrowing from the inlet $f$ to the inner edge, $a$ $b$, substantially as and for the purposes described.

In testimony whereof I have signed this specification in the presence of two subscribing witnesses.

ALEXANDER OBERMEYER.

Witnesses:
GEORGE KOCH,
HERMANN THICLENT.